(12) United States Patent
Lee

(10) Patent No.: US 11,660,680 B2
(45) Date of Patent: May 30, 2023

(54) QUICK-RELEASE TOOL CONNECTING ROD

(71) Applicant: TIEN-I INDUSTRIAL CO., LTD., Taichung (TW)

(72) Inventor: Larry Lee, Taichung (TW)

(73) Assignee: TIEN-I INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 17/366,282

(22) Filed: Jul. 2, 2021

(65) Prior Publication Data

US 2023/0001490 A1    Jan. 5, 2023

(51) Int. Cl.
| | | |
|---|---|---|
| *B23B 31/06* | (2006.01) | |
| *B25B 23/00* | (2006.01) | |
| *B23B 31/107* | (2006.01) | |

(52) U.S. Cl.
CPC .......... *B23B 31/06* (2013.01); *B25B 23/0035* (2013.01); *B23B 31/10741* (2021.01); *B23B 2231/04* (2013.01)

(58) Field of Classification Search
CPC .. B23B 31/06; B23B 2231/04; B25B 23/0035
See application file for complete search history.

(56) References Cited

U.S. PATENT DOCUMENTS

| | | | | |
|---|---|---|---|---|
| 3,073,192 | A * | 1/1963 | Beers | B25B 23/0035 403/324 |
| 5,732,606 | A * | 3/1998 | Chiang | B25B 23/0021 81/177.2 |
| 10,343,269 | B2 * | 7/2019 | Nino | B25B 23/141 |
| 10,919,132 | B2 * | 2/2021 | Huang | B25B 23/0028 |
| 2018/0178357 | A1 * | 6/2018 | Su | B25B 23/0021 |
| 2018/0215020 | A1 * | 8/2018 | Dumitru | B25B 23/12 |

* cited by examiner

*Primary Examiner* — Boyer D Ashley
*Assistant Examiner* — Reinaldo A Vargas Del Rio
(74) *Attorney, Agent, or Firm* — Muncy, Geissler, Olds & Lowe, P.C.

(57) ABSTRACT

A quick-release tool connecting rod is provided, including: a rod body, a quick-release mechanism and a second sleeve member. The rod body includes an inner space extending in an axial direction and a through hole communicated with the inner space. The quick-release mechanism includes a push rod received within the inner space, a locking member disposed within the through hole and a first sleeve member sleeved to the rod body. The first sleeve member is movable relative to the rod body in the axial direction to drive the push rod to move. The second sleeve member is co-movably sleeved to the first sleeve member, and the first sleeve member is partially embedded within an inner peripheral wall of the second sleeve member. The first sleeve member has a first hardness, and the second sleeve member has a second hardness which is smaller than the first hardness.

10 Claims, 7 Drawing Sheets

QUICK-RELEASE TOOL CONNECTING ROD

BACKGROUND OF THE INVENTION

Field of the Invention

The present invention relates to a quick-release tool connecting rod.

Description of the Prior Art

Rotary tools include pneumatic tools, electric tools and hand tools, which can be used with tool heads such as sockets and screwdrivers to drive fasteners to rotate for assembling and disassembling. The rotary tool can be assembled with an extension rod so as to be used in a narrow space. Conventionally, the extension rod has a quick-release mechanism so as to be quickly assembled to and disassembled from the rotary tool.

Specifically, the quick-release mechanism of the extension rod is switched between a locking state and a release state by operation of a sleeve sleeved to a rod body of the extension rod. However, the sleeve is easy to be damaged due to unexpected collisions that may also cause unsmooth operation of the quick-release mechanism. In addition, it is inconvenience and high cost to provide at least one of the sleeve and the rod body with an identified structure or a reinforcing structure.

The present invention is, therefore, arisen to obviate or at least mitigate the above-mentioned disadvantages.

SUMMARY OF THE INVENTION

The main object of the present invention is to provide a quick-release tool connecting rod, which provides stable assembling and good structural strength.

To achieve the above and other objects, the present invention provides a quick-release tool connecting rod, including: a rod body, a quick-release mechanism and a second sleeve member. The rod body includes an inner space extending in an axial direction and a through hole communicated with the inner space. The quick-release mechanism includes a push rod received within the inner space, a locking member disposed within the through hole and a first sleeve member sleeved to the rod body. The first sleeve member is movable relative to the rod body in the axial direction to drive the push rod to move between a locking position and a release position. The second sleeve member is co-movably sleeved to the first sleeve member, and the first sleeve member is partially embedded within an inner peripheral wall of the second sleeve member. The first sleeve member has a first hardness, and the second sleeve member has a second hardness which is smaller than the first hardness. When the push rod is in the locking position, the locking member is radially urged by the push rod and partially protrudes out of the rod body; and when the push rod is in the release position, the locking member is radially retractable without protruding out of the rod body.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIGS. 1 to 8 for a preferable embodiment of the present invention. A quick-release tool connecting rod 1 of the present invention includes a rod body 10, a quick-release mechanism 20 and a second sleeve member 30.

Figure 1:
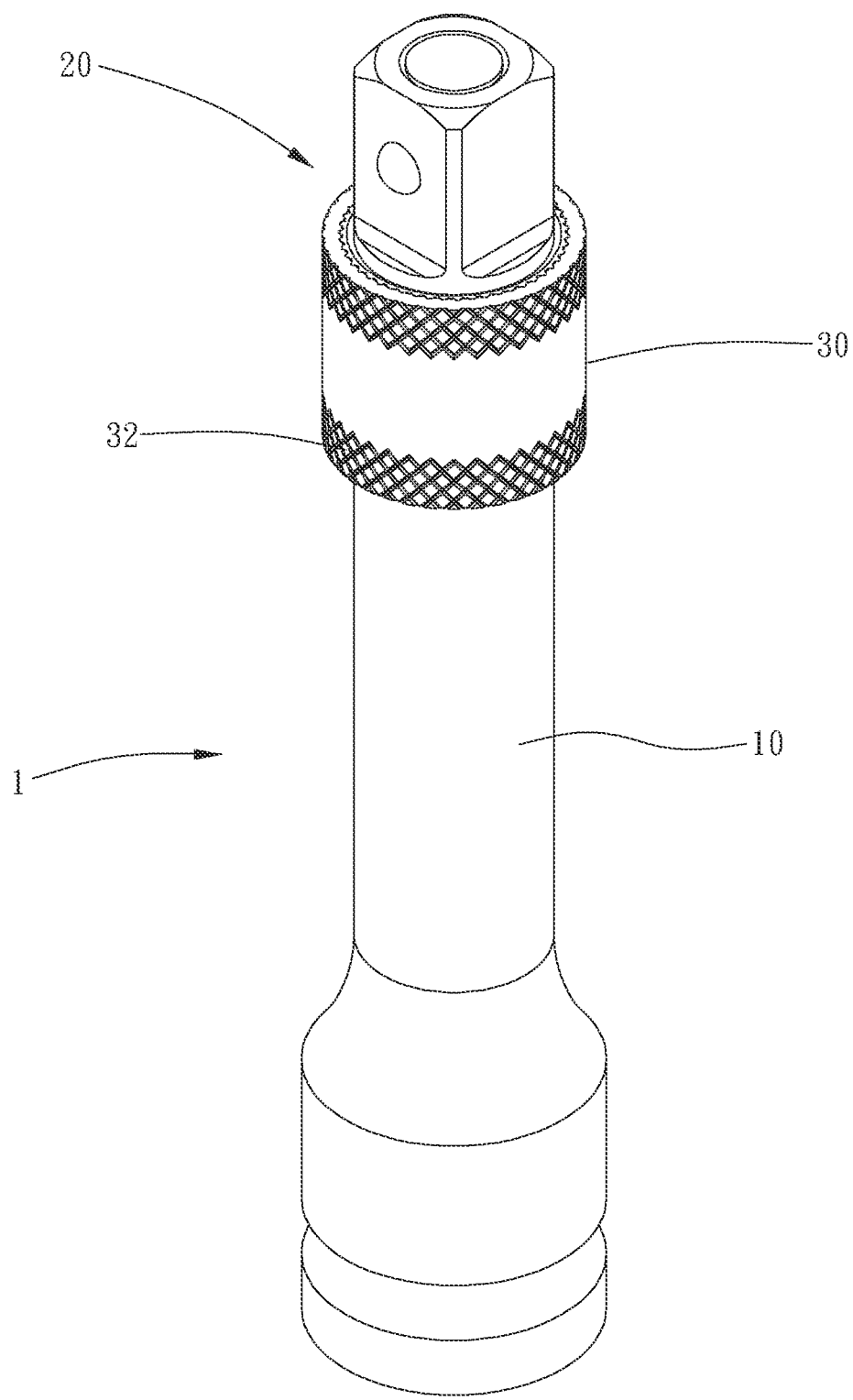
FIG. 1 is a stereogram of a preferable embodiment of the present invention.
Figure 2:
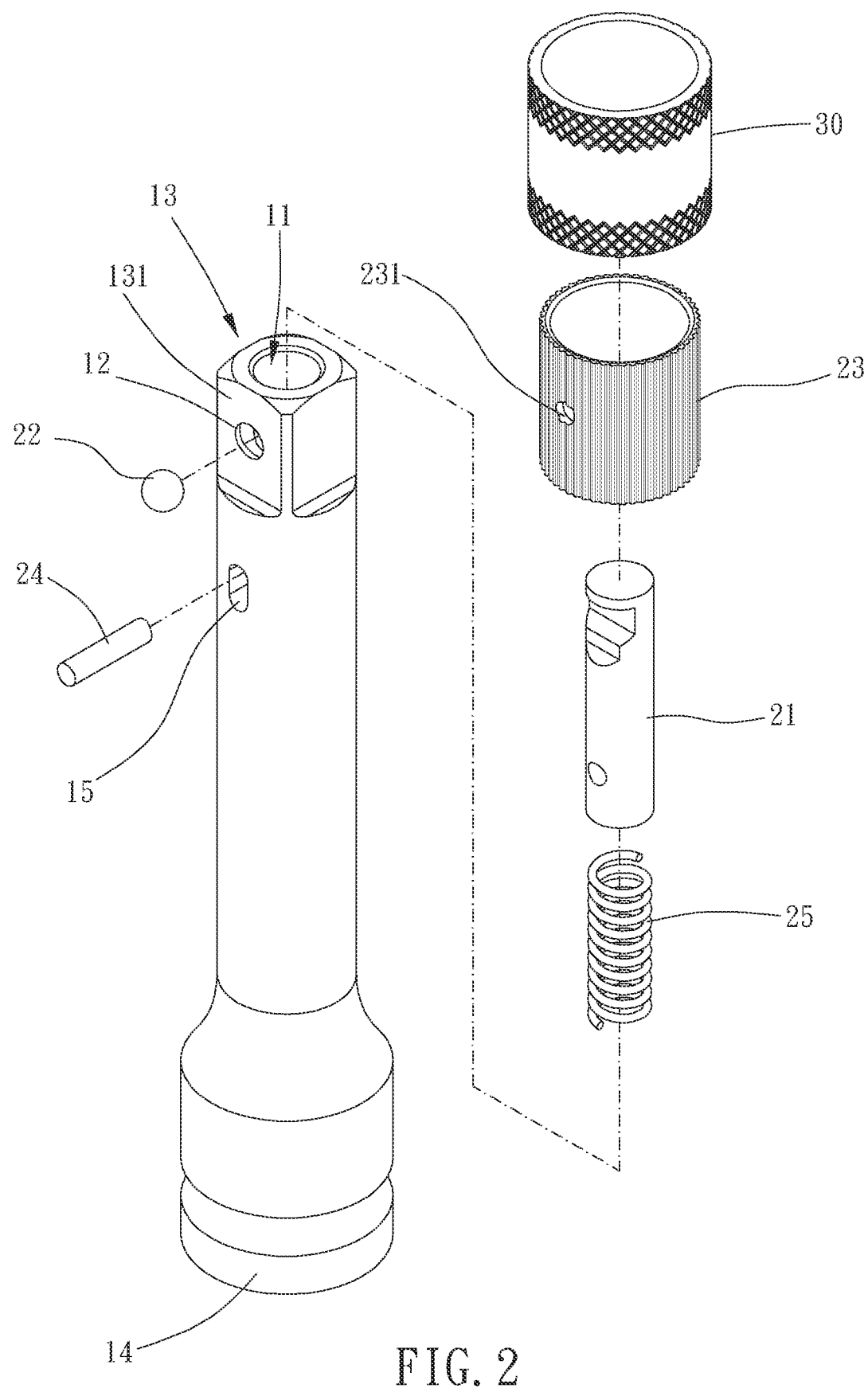
FIG. 2 is a breakdown drawing of a preferable embodiment of the present invention.
Figure 3:
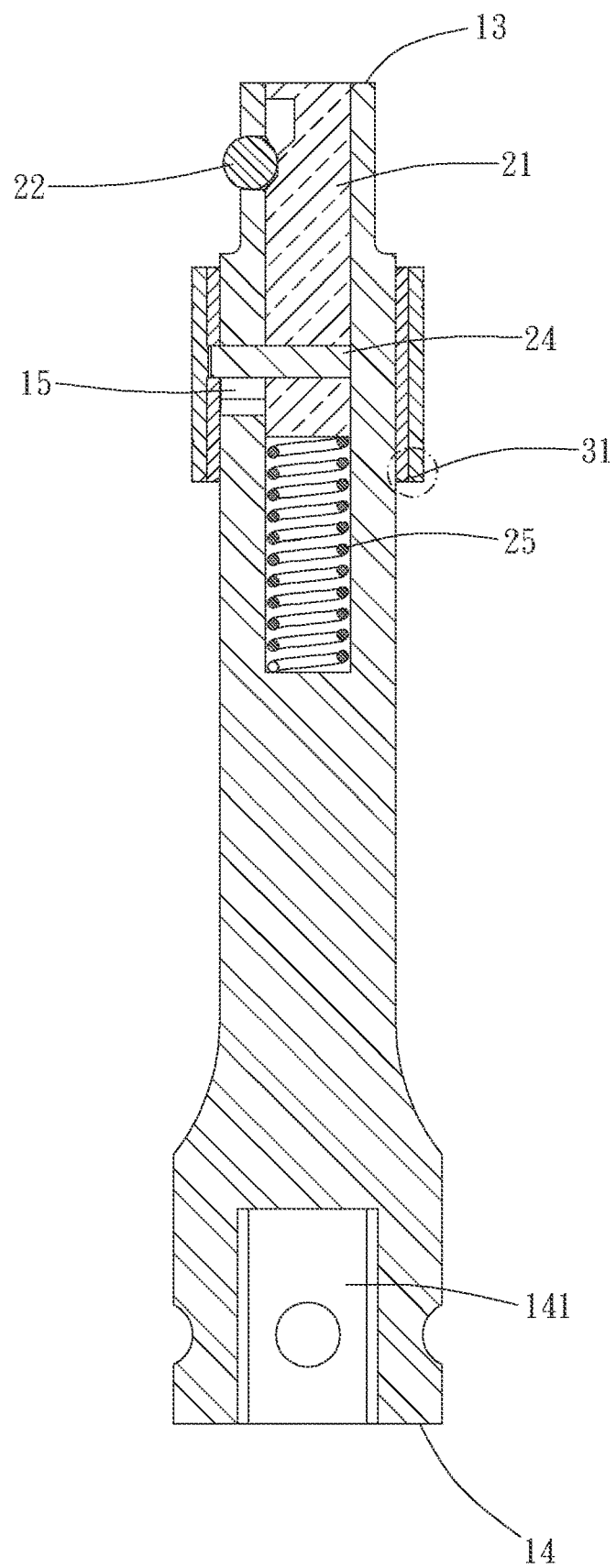
FIG. 3 is a cross-sectional view of a preferable embodiment of the present invention.
Figure 5:
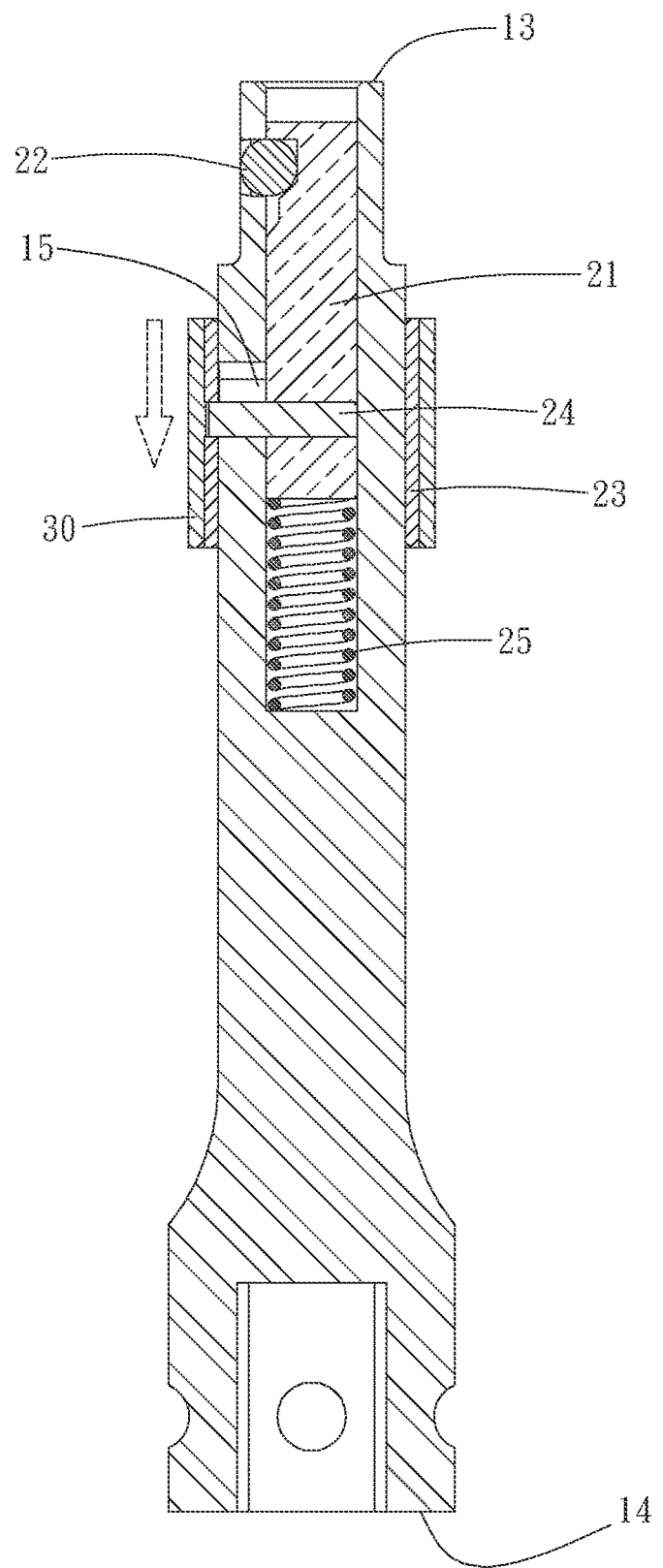
FIG. 5 is a cross-sectional view showing operation according to a preferable embodiment of the present invention.
Figure 6:
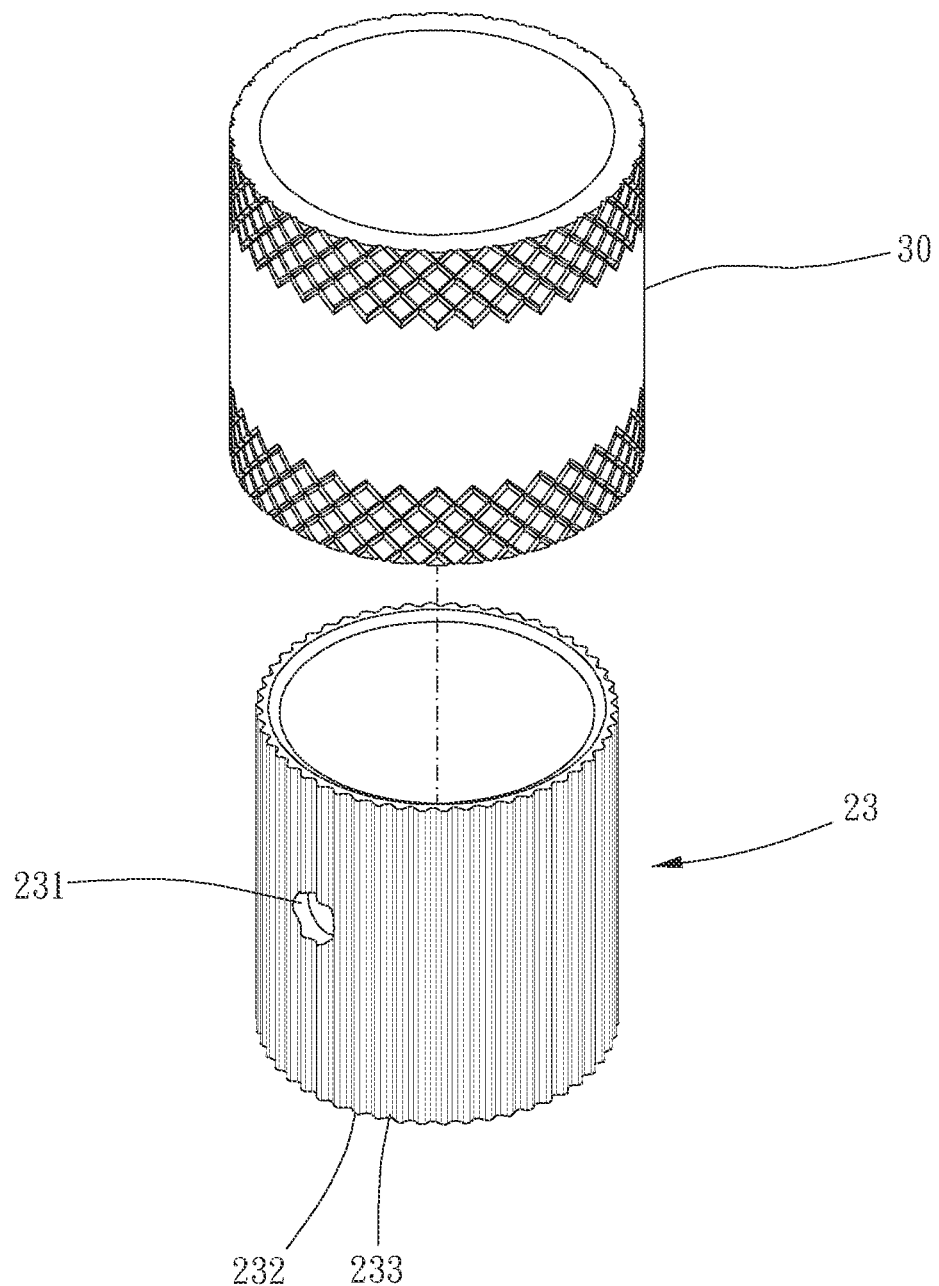
FIG. 6 is a drawing showing assembling of a first sleeve member and a second sleeve member according to a preferable embodiment of the present invention.

The rod body 10 includes an inner space 11 extending in an axial direction and a through hole 12 communicated with the inner space 11. The quick-release mechanism 20 includes a push rod 21 received within the inner space 11, a locking member 22 disposed within the through hole 12 and a first sleeve member 23 sleeved to the rod body 10. The first sleeve member 23 is movable relative to the rod body 10 in the axial direction to drive the push rod 21 to move between a locking position and a release position. The second sleeve member 30 is co-movably sleeved to the first sleeve member 23, and the first sleeve member 23 is partially embedded within an inner peripheral wall of the second sleeve member 30. Therefore, the second sleeve member 30 is stably assembled with the first sleeve member 23 to provide good structural strength and protect the first sleeve member 23 from external collisions. The first sleeve member 23 has a first hardness, and the second sleeve member 30 has a second hardness which is smaller than the first hardness so that the inner peripheral wall of the second sleeve member 30 is urged to deform by an outer peripheral wall of the first sleeve member 23. When the push rod 21 is in the locking position, the locking member 22 is radially urged by the push rod 21 and partially protrudes out of the rod body 10 (as shown in FIG. 3); and when the push rod 21 is in the release position, the locking member 22 is radially retractable without protruding out of the rod body 10 (as shown in FIG. 5) for quick release and stable assembling.

The rod body 10 further includes a first assembling portion 13 and a second assembling portion 14 opposite to the first assembling portion 13. In this embodiment, the quick-release mechanism 20 is disposed on the first assembling portion 13, and the first assembling portion 13 includes a polygonal column 131 configured to be sleeved with a rotated member, such as sockets, tool connecting rods, screws or the like. The second assembling portion 14 includes a polygonal hole 141 configured to be sleeved with a rotary tool, such as wrenches, adapters, or the like. Specifically, the rod body 10 has a sliding groove 15 radially disposed therethrough and communicated with the inner space 11, and the quick-release mechanism 20 further includes a sliding rod 24 movably disposed within the sliding groove 15. The first sleeve member 23 has a penetrating hole 231 corresponding to the sliding groove 15, and the sliding rod 24 is connected with the push rod 21 and penetrates within the through hole 231. The second sleeve member 30 is radially blockable with the sliding rod 24. Please refer to FIG. 5, when the second sleeve member 30 is moved in the axial direction, the first sleeve member 23 drives the sliding rod 24 to axially move along the sliding groove 15 and drives the push rod 21 to move to the release position, which has a simple structure and is easy to operate. Preferably, the quick-release mechanism 20 further includes an elastic member 25 received in the inner space 11, and the elastic member 25 is axially abutted against and between the push rod 21 and the rod body 10 so that the push rod 21 has a tendency to move in a direction toward the locking position. Therefore, the push rod 21 can return automatically to the locking position for stable engagement.

A difference between an outer diametrical dimension of the first sleeve member 23 and an inner diametrical dimension of the second sleeve member 30 is between 0.01 mm and 1.00 mm, which allows the first sleeve member 23 to be effectively embedded radially to the second sleeve member 30 and avoids relative movement. Preferably, the outer peripheral wall of the first sleeve member 23 has a plurality of convex portions 232 disposed thereon and spaced apart from one another so as to provide deformation space therebetween, and at least a portion of the plurality of convex portions 232 extends to an end surface of the first sleeve member 23 for easy assembling. The first sleeve member 23 is preferably non-rotatable relative to the second sleeve member 30 so as to directly drive the push rod 21 and have good force transmission effect. A density of the first sleeve member 23 is preferably larger than a density of the second sleeve member 30 so that the first sleeve member 23 has good structural strength and is easy to urge the second sleeve member 30 to deform during assembling. In the axial direction, a length of the second sleeve member 30 is larger than or equal to a length of the first sleeve member 23 so that the second sleeve member 30 can entirely cover the first sleeve member 23 and radially block the sliding rod 24, which is easy to assemble and provides good reinforcement effect. In this embodiment, the first sleeve member 23 is formed with the through hole 231 at first, and then the plurality of convex portions 232 is formed so as to avoid dislocation during drilling and damage of the structure of the plurality of convex portions 232. The plurality of convex portions 232 may be formed by rolling, which provides surface densification, good structural strength and no chips during processing. Preferably, the difference between the outer diametrical dimension of the first sleeve member 23 and the inner diametrical dimension of the second sleeve member 30 is between 0.05 mm and 0.15 mm so that the first sleeve member 23 is easy to be assembled with and stably engaged with the second sleeve member 30. The first sleeve member 23 may be made of steel to have a sufficient hardness, and the second sleeve member 30 may be made of aluminum alloy so as to have a light weight and be easy to process to form anti-slip or/and identified structures. An outer periphery wall of the second sleeve member 30 has at least one embossing portion 32, which provides anti-slip effect and preferable appearance. However, the length of the second sleeve member may be smaller than the length of the first sleeve member; the first sleeve member and the second sleeve member may be made of other materials; and the plurality of convex portions may be formed by cutting or other processing methods.

Figure 7:
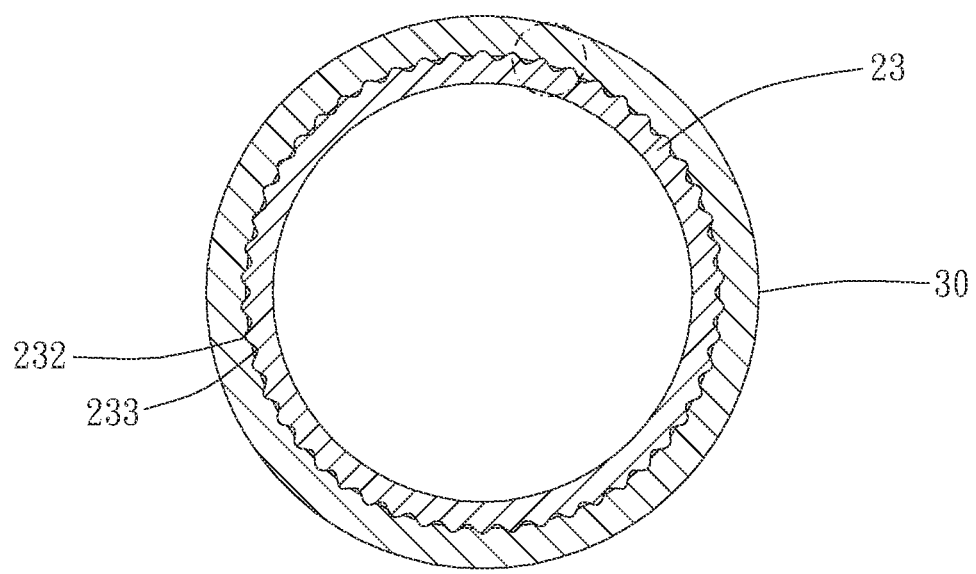
FIG. 7 is a cross-sectional view of the first sleeve member and the second sleeve member according to a preferable embodiment of the present invention.
Figure 8:
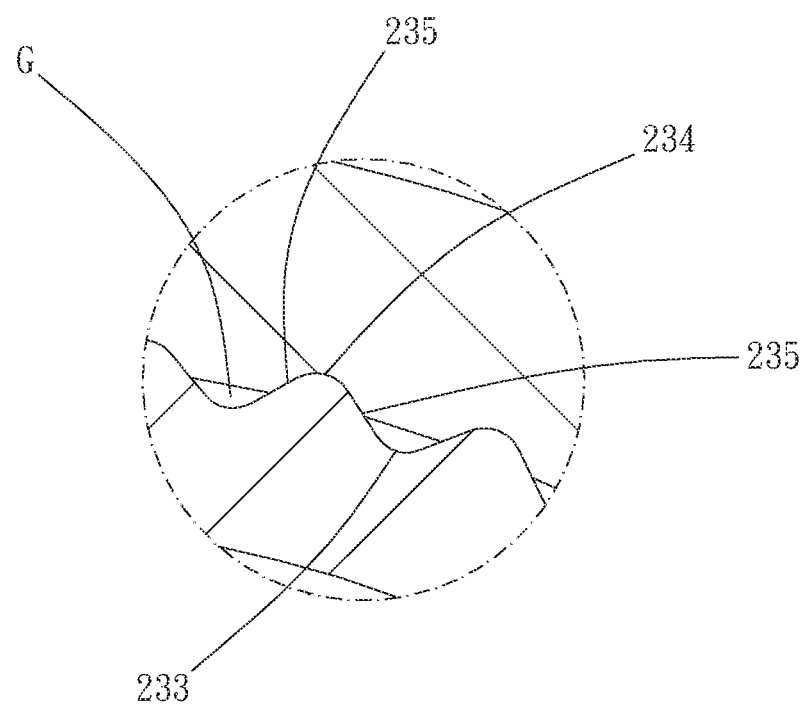
FIG. 8 is a partial enlargement of FIG. 7.

Moreover, each of the plurality of convex portions 232 extends continuously between two end surfaces of the first sleeve member 23. As shown in FIGS. 7 and 8, adjacent two of the plurality of convex portions 232 define a concave portion 233 therebetween, and a gap G is formed between each said concave portion 233 and the inner peripheral wall of the second sleeve member 30 so as to have sufficient deformation space and prevent the outer periphery wall of the second sleeve member 30 from deformation. A radial width of each said gap G is smaller than ⅔ of a maximum depth of one said concave portion 233 relative to one of the plurality of convex portions 232 so that the second sleeve member 30 and the first sleeve member 23 are stably engaged and non-rotatable relative to each other. Each of the plurality of convex portions 232 includes an arcuate surface 234 and two extension surfaces 235, and the two extension surfaces 235 extend from two opposite sides of the arcuate surface 234 and obliquely away from each other so that each of the plurality of convex portions 232 has a smooth surface to avoid deformation and broken during assembling with the second sleeve member 30. In other embodiments, the first sleeve member and the second sleeve member may entirely contact with each other without the gap; and each of the plurality of convex portions may be a ribs with a flat top surface or an acute angle.

Figure 4:
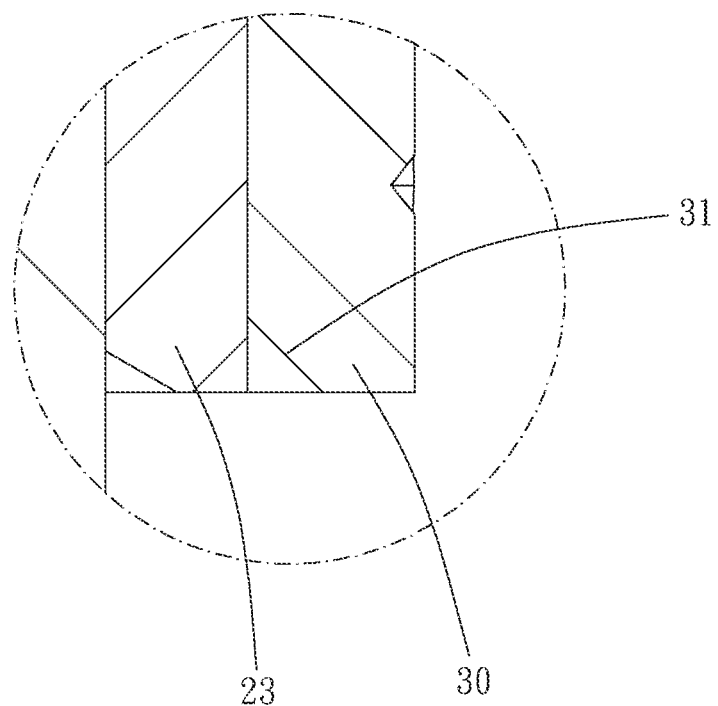
FIG. 4 is a partial enlargement of FIG. 3.

Preferably, the inner peripheral wall of the second sleeve member 30 includes a guiding portion 31 adjacent to an end opening of the second sleeve member 30 (as shown in FIG. 4), and a diametrical dimension of the guiding portion 31 is larger than the outer diametrical dimension of the first sleeve member 23 for easy assembling. In this embodiment, the guiding portion 31 is an annular inclined surface radially extending outward. In assembling, the guiding portion 31 is axially abutted against an end of the first sleeve member 23, and the second sleeve member 30 is sleeved to the first sleeve member 23 by exerting force from another end of the second sleeve member 30 opposite to the guiding portion 31, which is easy to manufacture and processing and is low cost. However, the guiding portion may be an arcuate surface or an annular step.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A quick-release tool connecting rod, including:
a rod body, including an inner space extending in an axial direction and a through hole communicated with the inner space;
a quick-release mechanism, including a push rod received within the inner space, a locking member disposed within the through hole and a first sleeve member sleeved to the rod body, the first sleeve member being movable relative to the rod body in the axial direction to drive the push rod to move between a locking position and a release position; and
a second sleeve member, co-movably sleeved to the first sleeve member, the first sleeve member partially embedded within an inner peripheral wall of the second sleeve member;
wherein the first sleeve member has a first hardness, the second sleeve member has a second hardness which is smaller than the first hardness; the inner peripheral wall of the second sleeve member is urged to deform by an outer peripheral wall of the first sleeve member, and the first sleeve member is non-rotatable relative to the second sleeve member; when the push rod is in the locking position, the locking member is radially urged by the push rod and partially protrudes out of the rod body; when the push rod is in the release position, the locking member is radially retractable without protruding out of the rod body.

2. The quick-release tool connecting rod of claim 1, wherein the outer peripheral wall of the first sleeve member has a plurality of convex portions disposed thereon and spaced apart from one another, and at least a portion of the plurality of convex portions extends to an end surface of the first sleeve member.

3. The quick-release tool connecting rod of claim 2, wherein adjacent two of the plurality of convex portions define a concave portion therebetween, and a gap is formed between each said concave portion and the inner peripheral wall of the second sleeve member.

4. The quick-release tool connecting rod of claim 3, wherein a radial width of each said gap is smaller than ⅔ of a maximum depth of one said concave portion relative to one of the plurality of convex portions.

5. The quick-release tool connecting rod of claim 1, wherein the inner peripheral wall of the second sleeve member includes a guiding portion adjacent to an end opening of the second sleeve member, and a diametrical dimension of the guiding portion is larger than an outer diametrical dimension of the first sleeve member.

6. The quick-release tool connecting rod of claim 1, wherein the rod body has a sliding groove radially disposed therethrough and communicated with the inner space, the quick-release mechanism further includes a sliding rod movably disposed within the sliding groove, the first sleeve member has a penetrating hole corresponding to the sliding groove, the sliding rod is connected with the push rod and penetrates within the penetrating hole, and the second sleeve member is radially blockable with the sliding rod.

7. The quick-release tool connecting rod of claim 1, wherein in the axial direction, a length of the second sleeve member is larger than or equal to a length of the first sleeve member.

8. The quick-release tool connecting rod of claim 1, wherein a density of the first sleeve member is larger than a density of the second sleeve member.

9. The quick-release tool connecting rod of claim 1, wherein a difference between an outer diametrical dimension of the first sleeve member and an inner diametrical dimension of the second sleeve member is between 0.01 mm and 1.00 mm.

10. The quick-release tool connecting rod of claim 4, wherein each of the plurality of convex portions includes an arcuate surface and two extension surfaces, and the two extension surfaces extend from two opposite sides of the arcuate surface and obliquely away from each other; each of the plurality of convex portions extends continuously between two end surfaces of the first sleeve member; the inner peripheral wall of the second sleeve member includes a guiding portion adjacent to an end opening of the second sleeve member, and a diametrical dimension of the guiding portion is larger than an outer diametrical dimension of the first sleeve member; the guiding portion is an annular inclined surface radially extending outward; the rod body has a sliding groove radially disposed therethrough and communicated with the inner space, the quick-release mechanism further includes a sliding rod movably disposed within the sliding groove, the first sleeve member has a penetrating hole corresponding to the sliding groove, the sliding rod is connected with the push rod and penetrates within the penetrating hole, and the second sleeve member is radially blockable with the sliding rod; the quick-release mechanism further includes an elastic member received in the inner space, the elastic member is axially abutted against and between the push rod and the rod body so that the push rod has a tendency to move in a direction toward the locking position; in the axial direction, a length of the second sleeve member is larger than or equal to a length of the first sleeve member; a density of the first sleeve member is larger than a density of the second sleeve member; a difference between the outer diametrical dimension of the first sleeve member and an inner diametrical dimension of the second sleeve member is between 0.05 mm and 0.15 mm; an outer periphery wall of the second sleeve member has at least one embossing portion; the first sleeve member is made of steel; and the second sleeve member is made of aluminum alloy.

* * * * *